United States Patent [19]

Weiler et al.

[11] 4,233,884

[45] Nov. 18, 1980

[54] VACUUM BRAKE BOOSTER

[75] Inventors: Rolf Weiler, Frankfurt-Sindlingen; Peter Böhm, Frankfurt am Main, both of Fed. Rep. of Germany

[73] Assignee: ITT Industries, Inc., New York, N.Y.

[21] Appl. No.: 28,470

[22] Filed: Apr. 9, 1979

[30] Foreign Application Priority Data

May 20, 1978 [DE] Fed. Rep. of Germany ....... 2822101

[51] Int. Cl.³ .......................... F15B 9/10; B60T 13/20
[52] U.S. Cl. ..................................... 91/369 B; 60/554
[58] Field of Search ............. 91/369 B, 369 R, 369 A; 60/554

[56] References Cited

U.S. PATENT DOCUMENTS

| | | | |
|---|---|---|---|
| 2,826,041 | 3/1958 | Rike | 91/369 B |
| 3,470,697 | 10/1969 | Pech | 60/554 |
| 3,499,288 | 3/1970 | Randol | 60/554 |
| 4,107,926 | 8/1978 | Adachi | 91/369 B |

*Primary Examiner*—Edward J. McCarthy
*Attorney, Agent, or Firm*—John T. O'Halloran; Alfred C. Hill

[57] ABSTRACT

In prior art vacuum brake boosters embodying a two-stage reaction, the magnitude of the two-stage reaction is limited because of the small space available for the reaction-delaying spring. Moreover, the lost motion present in the reaction lever mechanism has to be overcome when the braking operation is initiated. These disadvantages are overcome in a vacuum brake booster including a reaction mechanism constructed in accordance with the present invention wherein the reaction-delaying spring is positioned on the side of the reaction levers adjacent the vacuum chamber and by having the point of contact of the spring on the reaction levers at a greater radius than the point at which the levers are in engagement with the movable wall.

24 Claims, 4 Drawing Figures

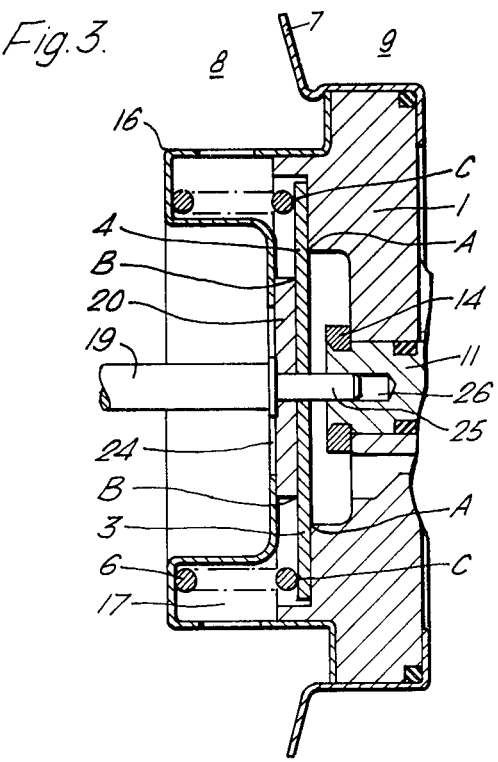
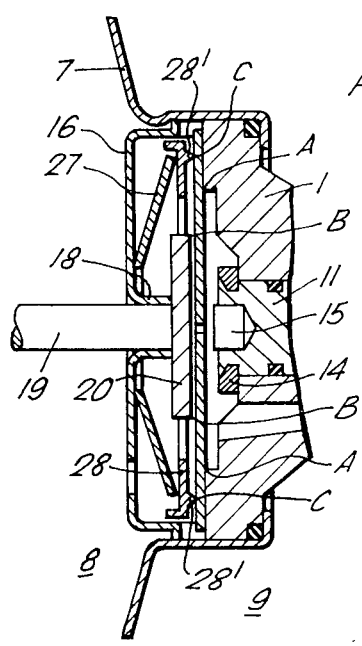

VACUUM BRAKE BOOSTER

BACKGROUND OF THE INVENTION

The present invention relates to a vacuum brake booster and more particularly to a vacuum brake booster having a two-stage reaction arrangement.

From U.S. Pat. No. 2,826,041, a vacuum brake booster is known which comprises a constant atmospheric pressure chamber and a working chamber in which different pressures prevail, with a movable wall dividing the chambers and being mounted on a plunger, and a control valve which is actuated by a brake pedal. The control valve controls the differentials of pressure acting on the movable wall. Carried on the end of the plunger adjacent the control valve is a support plate whose outer edge is raised in the direction of the control valve. Between the plunger and the control valve, several reaction levers are positioned which, on the one side, bear against the movable wall radially outwardly and against a reaction-delaying spring radially inwardly, and, on the other side, bear against the edge of the support plate. In this arrangement, the point at which the reaction levers are in engagement with the support plate lies radially between the points of engagement on the spring and the movable wall. The spring is positioned between the control casing and the reaction levers and is adapted to bear upon the reaction levers directly, or through the intermediary of a disc. The biasing force of the spring provides for the what is termed "two-stage reaction" which means the retardation of the reaction force acting on the brake pedal.

In this known construction, the space available for the spring is small with regards to both the axial length and the diameter. Enlarging the space in a radial direction is not possible because this would reduce the lever arm through which the spring counteracts the reaction force. In addition, the point at which the spring is in engagement with the reaction levers must be placed in a smaller radius than the edge of the support plate. The use of a radially larger spring would, thus, require the whole lever mechanism to be enlarged radially, too, or the spring force would have to be shifted to a smaller radius by the insertion of an intermediary. An axial enlargement would result in an enlargement of the overall length of the brake booster.

The magnitude of the two-stage reaction is dependent upon the lever transmission ratio of the booster, the strength of the reaction-delaying spring and the point of impact of the reaction-delaying spring. Because of the small space available for accommodating the reaction-delaying spring, the magnitude of the two-stage reaction is limited.

Since only small springs may be used, there is the necessity of choosing a high spring stiffness which has, however, the disadvantage of the spring force increasing substantially when the spring is loaded. This means that the force of the spring is lower in the released state of the arrangement than during engagement of the valve piston with the reaction levers. The change of force is dependent upon the distance between the valve piston and the levers in the released state, which distance is largely affected by tolerances. These tolerances affect directly the magnitude of the two-stage reaction. Accordingly, it is not possible to obtain a defined two-stage reaction using a reaction-delaying spring having a high stiffness.

Moreover, the known arrangement results in lost motion in the reaction lever mechanism which has to be overcome first when the braking action is initiated.

Further, the use of strong springs raises assembly problems because the assembly of the individual parts which are in engagement with the reaction levers requires high expenditure of forces.

SUMMARY OF THE INVENTION

It is, therefore, an object of the present invention to provide a vacuum brake booster including a two-stage reaction overcoming the above-mentioned shortcomings of the known arrangements.

A feature of the present invention is the provision of a vacuum brake booster comprising: a vacuum chamber having a longitudinal axis in which a constant pressure prevails; a working chamber disposed coaxial of the axis in which different pressures prevail; a movable wall separating the vacuum chamber and the working chamber; a control valve supported by the movable wall coaxial of the axis actuated by a brake pedal to control the differentials of pressure acting on the movable wall; a master cylinder controlling push-rod disposed coaxial of the axis in a force transmitting relation with the movable wall extending into the vacuum chamber; reaction levers in engagement with the movable wall at a first location and in engagement with the push rod at a second location, the first location being disposed at a greater radial distance from the axis than the second location; and a reaction-delaying spring acting on one side of the reaction levers adjacent the vacuum chamber at a third location having a greater radial distance from the axis than the first location.

The basic idea behind the brake booster constructed in accordance with the present invention is that the reaction-delaying spring is received in a space which is available anyway and which is a multiple greater, in both radial and axial direction, than the space provided for the reaction-delaying spring in known arrangements. From this arrangement there results substantial advantages, for example, the elimination of lost motion in the reaction lever mechanism, the possibility of utilizing large springs of any desired stiffness, a low preload under which the springs are mounted, an increased lever arm with which the spring counteracts the reaction force, and the possibility of achieving any desired two-stage reaction operation by the use of different springs.

In a preferred embodiment of the subject-matter of the present invention, two symmetrically arranged reaction levers are provided. This arrangement reduces the number of necessary individual components to a minimum, thus, saving material and assembly costs. The spring producing the two-stage reaction is advantageously a helical spring or a Belleville spring inserted between the reaction levers and a cap secured to the movable wall on the vacuum side thereof. The cap provides a bearing surface for the spring, which surface is in a fixed spaced relationship to the control casing. Thus, the spring force acting on the reaction levers is always of the same magnitude, i.e., the characteristic of the reaction operation is not affected by the position of the control casing or the valve piston.

In another preferred embodiment of the subject-matter of the present invention, a spring plate is positioned between the spring and the reaction lever, with narrow projections being provided on the spring plate on the side adjacent the reaction levers at least in the area of the reaction levers, the projections causing the spring plate to be in point or line contact with the reaction levers. This arrangement permits a precise definition of the point of impact of the spring on the reaction levers. It enables the manufacture of different spring plates in which the projections are arranged along different radii. Thus, it is possible to obtain a different two-stage reaction by using a different spring plate.

In another embodiment of the invention, the push-rod is provided with a reaction plate which is in engagement with the reaction levers at the second location. The size of the reaction plate determines the plate of engagement of the reaction levers with the push-rod and, hence, the length of the effective lever arm. The reaction plate may be secured to the end of the push-rod, for example, by welding or by slipping the reaction plate on a pin provided at the end of the push-rod. In order to reduce the axial length of a power brake unit including a brake booster and a master cylinder attached thereto, it will be an advantage to arrange the master cylinder so that its centering collar enters the space accommodating the spring. To avoid noise, it will be an advantage to position a valve-piston cushioning member between the valve piston and the reactive levers. A simple support for the push-rod is provided by the provision of a push-rod guide in the cap.

BRIEF DESCRIPTION OF THE DRAWING

Above-mentioned and other features and objects of this invention will become more apparent by reference to the following description taken in conjunction with the accompanying drawing, in which:

FIG. 3 is a longitudinal cross section of part of a vacuum brake booster including a second embodiment of a reaction lever mechanism in accordance with the principles of the present invention; and FIG. 4 is a longitudinal cross section of part of a vacuum brake booster including a third embodiment of a reaction lever mechanism in accordance with the principles of the present invention.

DESCRIPTION OF THE PREFERRED EMBODIMENTS

Figure 1:
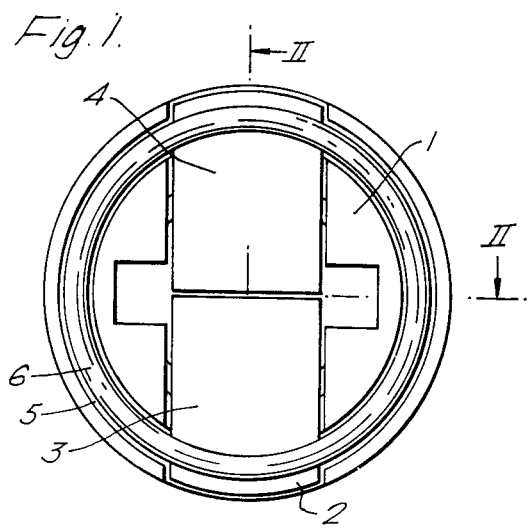
FIG. 1 is a top plan view of a first embodiment of a reaction lever arrangement of a vacuum brake booster in accordance with the principles of the present invention.

FIG. 1 shows a control casing 1 including a longitudinal flat indentation 2 in which two reaction levers 3 and 4 are symmetrically arranged. An annular indentation 5 close by the outer edge of the control casing 1 receives a helical spring 6 which is in interaction with reaction levers 3 and 4.

Figure 2:
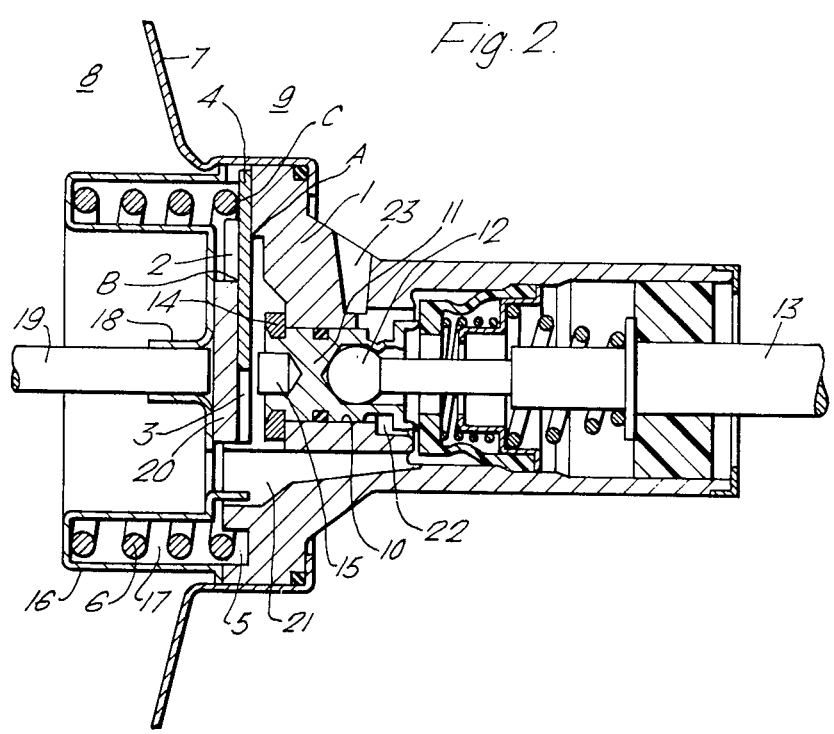
FIG. 2 is a longitudinal cross section taken along the line II—II of FIG. 1.

FIG. 2 shows control casing 1 in longitudinal cross-section taken along the line II—II of FIG. 1. Control casing 1 is secured in a diaphragm member 7 separating a vacuum chamber 8 from a working chamber 9. Two reaction levers 3 and 4 are disposed in a flat indentation 2 in control casing 1. A valve piston 11 is guided in a coaxial bore 10 in control casing 1. Valve piston 11 receives on its one end a ball-shaped end 12 of a piston rod 13, while the other end of valve piston 11 carries a stop ring 14 limiting the axial movement of valve piston 11 in the direction toward piston rod 13. A valve-piston cushioning member 15 is arranged in the middle of the front end of valve piston 11 adjacent reaction levers 3 and 4.

Secured to the side of diaphragm member 7 adjacent vacuum chamber 8 is a cap 16 which bears against the outer edge of control casing 1. An annular chamber 17 in cap 16 receives a helical spring 6 bearing on the one side against the front wall of annular chamber 17 while its other end, which is embedded in annular indentation 5 of control casing 1, bears against the outer ends of reaction levers 3 and 4. Cap 16 is provided with a guide sleeve 18 extending coaxially with valve piston 11 and guiding a push-rod 19 therein which acts upon the piston of a master cylinder not shown in the drawing. A reaction plate 20 is welded to the end of push-rod 19 adjacent control casing 1. "A" identifies a first location at which reaction levers 3 and 4 are in engagement with control casing 1, and "B" identifies a second location at which reaction levers 3 and 4 are in engagement with reaction plate 20. The force of spring 6 acts upon reaction levers 3 and 4 at a third location "C".

In the inactivated position of the brake booster, vacuum chamber 8 and working chamber 9 are in communication with each other through openings 21, 22 and 23 in control casing 1 and sealed relative to the outside. Valve piston 11 is in its end position adjacent working chamber 9. A subatmospheric pressure prevails in both chambers 8 and 9. Push-rod 19 is in its end position adjacent vacuum chamber 8, with the force of spring 6 maintaining reaction levers 3 and 4 in such a position that they are in abutment with reaction plate 20.

When the brake pedal is depressed, piston rod 13 will displace valve piston 11 in the direction of reaction levers 3 and 4 until the connection between openings 21 and 22 is closed by a valve, while at the same time a connection of forking chamber 9 to atmospheric pressure is established through openings 23 and 22. To achieve this, valve piston 11 is required to travel a short distance only. The pressure differential between the pressures prevailing in chambers 8 and 9 causes diaphragm member 7 to move in the direction of vacuum chamber 8 and to act upon the master cylinder by means of push-rod 19. As a result of the pressure developing in the master cylinder, a force will act upon push-rod 19 which counteracts the direction of movement of diaphragm member 7. There occurs a movement of push-rod 19 relative to diaphragm member 7 and control casing 1, respectively, with reaction plate 20 being urged against reaction levers 3 and 4. This force is transmitted to control casing 1 and, thus, cannot be felt at the brake pedal. The magnitude of the reaction force acting upon control casing 1 is determined by the strength of spring 6 and the distances between points A and B and points A and C.

If the actuating force at the brake pedal is increased to such an amount that spring 6 is unable to absorb the reaction force completely, reaction levers 3 and 4 will pivot about point A and the inner ends of reaction levers 3 and 4 enter into interaction with valve piston 11. The reaction force can then be felt at the brake pedal. With the actuating force continuing to increase, valve piston 11 will urge reaction levers 3 and 4 into flat engagement with reaction plate 20, thus, acting upon push-rod 19 and the master-cylinder piston.

FIG. 3 is a longitudinal cross section through a reaction lever mechanism of a vacuum brake booster with a different push-rod arrangement. As far as this arrangement corresponds to the arrangement of FIG. 2, like parts have been assigned like reference numerals. Cap 16 is provided with an opening 24 through which push-rod 19 enters cap 16. Cap 16 does not have a guide sleeve to carry push-rod 19. At its end adjacent control casing 1, push-rod 19 has a pin 25 on which reaction plate 20 is arranged. For example, reaction plate 20 may be slipped onto pin 25. Pin 25 engages into a bore 26 at the front end of valve piston 11 and is carried therein slidably.

The mode of operation of this reaction lever arrangement is the same as that described with reference to FIG. 2 so that a repetition of the description may be dispensed with. The advantage of the arrangement shown in FIG. 3 over the arrangement of FIG. 2 is the simpler design of cap 16.

FIG. 4 is a longitudinal cross section through a reaction lever mechanism of a brake booster including a Belleville spring. As far as this arrangement corresponds to the arrangement of FIG. 2, like parts have been assigned like reference numerals. Cap 16 is of relatively flat design and includes a guide sleeve 18 to carry push-rod 19. Cap 16 accommodates a Belleville spring 27 which is inserted between cap 16 and a spring plate 28. On its side adjacent reaction levers 3 and 4, spring plate 28 is provided with narrow projections 28' in the area of reaction levers 3 and 4, projections 28' causing spring plate 28 to be in a point or line contact with reaction levers 3 and 4 at the third location "C".

The mode of operation of this reaction lever arrangement does not differ from the mode of operation described with reference to FIG. 2. The advantages afforded by this design are, in particular, that less expensive parts can be used and that, in order to obtain a different two-stage reaction, merely another spring plate 28 has to be inserted wherein projections 28' are at a greater or lesser distance from the center of spring plate 28. In the manufacture of vacuum brake boosters providing different two-stage reactions, this is suitable because identical parts are used for all types of booster, only spring plates 28 are different.

While we have described above the principles of our invention in connection with specific apparatus it is to be clearly understood that this description is made only by way of example and not as a limitation to the scope of our invention as set forth in the objects thereof and in the accompanying claims.

We claim:
1. A vacuum brake booster comprising:
   a vacuum chamber having a longitudinal axis in which a constant pressure prevails;
   a working chamber disposed coaxial of said axis in which different pressures prevail;
   a movable wall separating said vacuum chamber and said working chamber;
   a control valve supported by said movable wall coaxial of said axis actuated by a brake pedal to control the differentials of pressure acting on said movable wall;
   a master cylinder controlling push-rod disposed coaxial of said axis in a force transmitting relation with said movable wall extending into said vacuum chamber;
   reaction levers in engagement with said movable wall at a first location and in engagement with said push-rod at a second location, said first location being disposed at a greater radial distance from said axis than said second location; and
   a reaction-delaying spring acting on one side of said reaction levers adjacent said vacuum chamber at a third location having a greater radial distance from said axis than said first location.

2. A brake booster according to claim 1, wherein said reaction levers include
   two symmetrically arranged reaction levers.

3. A brake booster according to claim 2, wherein said spring is a helical spring.

4. A brake booster according to claim 3, wherein said spring is inserted between said one side of said reaction levers and a cap secured to one side of said movable wall adjacent said vacuum chamber.

5. A brake booster according to claim 4, wherein said cap includes
   a guide coaxial of said axis for said push-rod.

6. A brake booster according to claim 5, wherein said push-rod includes
   a reaction plate in engagement with said reaction levers at said second location.

7. A brake booster according to claim 6, wherein said control valve includes
   a valve piston disposed coaxial of said axis, and
   a cushion member disposed in an end of said valve piston adjacent said reaction levers.

8. A brake booster according to claim 2, wherein said spring is a Belleville spring.

9. A brake booster according to claim 8, wherein said spring is inserted between said one side of said reaction levers and a cap secured to one side of said movable wall adjacent said vacuum chamber.

10. A brake booster according to claim 9, wherein said cap includes
    a guide coaxial of said axis for said push-rod.

11. A brake booster according to claim 10, further including
    a spring plate disposed between said spring and said reaction levers, said spring plate having projections on the side thereof adjacent said reaction levers for engagement with said reaction levers at said third location.

12. A brake booster according to claim 11, wherein said push rod includes
    a reaction plate in engagement with said reaction levers at said second location.

13. A brake booster according to claim 12, wherein said control valve includes
    a valve piston disposed coaxial of said axis, and
    a cushion member disposed in an end of said valve piston adjacent said reaction levers.

14. A brake booster according to claim 1, wherein said spring is a helical spring.

15. A brake booster according to claim 14, wherein said spring is inserted between said one side of said reaction levers and a cap secured to one side of said movable wall adjacent said vacuum chamber.

16. A brake booster according to claim 15, wherein said cap includes
    a guide coaxial of said axis for said push-rod.

17. A brake booster according to claim 16, wherein said push-rod includes
    a reaction plate in engagement with said reaction levers at said second location.

18. A brake booster according to claim 17, wherein said control valve includes
    a valve piston disposed coaxial of said axis, and
    a cushion member disposed in an end of said valve piston adjacent said reaction levers.

19. A brake booster according to claim 1, wherein said spring is a Belleville spring.

20. A brake booster according to claim 19, wherein said spring is inserted between said one side of said reaction levers and a cap secured to one side of said movable wall adjacent said vacuum chamber.

21. A brake booster according to claim 20, wherein said cap includes
a guide coaxial of said axis for said push-rod.

22. A brake booster according to claim 21, further including
a spring plate disposed between said spring and said reaction levers, said spring plate having projections on the side thereof adjacent said reaction levers for engagement with said reaction levers at said third location.

23. A brake booster according to claim 22, wherein said push-rod includes
a reaction plate in enagement with said reaction levers at said second location.

24. A brake booster according to claim 23, wherein said control valve includes
a valve piston disposed coaxial of said axis, and
a cushion member disposed in an end of said valve piston adjacent said reaction levers.

* * * * *